United States Patent [19]

Crevoisier

[11] Patent Number: 4,794,722
[45] Date of Patent: Jan. 3, 1989

[54] FISHING DEVICE

[76] Inventor: Rene Crevoisier, 2714 Les Genevez, Switzerland

[21] Appl. No.: 178,138

[22] Filed: Apr. 6, 1988

[30] Foreign Application Priority Data

Apr. 8, 1987 [CH] Switzerland .......................... 1345/87

[51] Int. Cl.⁴ ............................................ A01K 91/00
[52] U.S. Cl. ..................... 43/42.72; 43/42.02
[58] Field of Search ........................ 43/42.72, 42.02

[56] References Cited

U.S. PATENT DOCUMENTS

| | | | |
|---|---|---|---|
| 1,444,876 | 2/1923 | Hanson | 43/42.72 |
| 2,731,758 | 1/1956 | Coe | 43/42.72 |
| 3,037,315 | 6/1962 | Klawitter | 43/42.02 |
| 3,693,275 | 9/1972 | Craig | 43/42.72 |
| 4,676,020 | 6/1987 | Taylor | 43/42.02 |
| 4,748,763 | 6/1988 | Giraudo | 43/42.72 |

FOREIGN PATENT DOCUMENTS 13048 of 1907 United Kingdom ............... 43/42.72

Primary Examiner—Gene P. Crosby
Attorney, Agent, or Firm—McGlew and Tuttle

[57] ABSTRACT

A fishing device for preventing a line from breaking when a fish has been hooked. The fishing device comprises a hollow cylinder in which a piston is slidably mounted. The piston is provided on one of its flat surfaces with a rod that extends out of the cylinder. The free end of the rod is formed with an eyelet. A tab with a similar eyelet is provided at the opposite end of the cylinder. On its other flat surface, the piston is provided with a pair of elastic jaws that engage the end of a retaining stud that is solid with the cylinder. A coil spring is fitted around the piston rod and bears at one end on the cylinder and at its other end on the piston. To use the fishing device, the adjacent ends of two line portions are connected to the eyelets. When the jaws are engaged on the stud, the piston is solid with the cylinder and a fish may be struck as if the line were uninterrupted. Once hooked, a fish can exert considerable pulls on the line. These pulls cause the piston to disengage from the stud so as to be damped by the spring, thereby reducing the strain on the line and helping it not to break.

11 Claims, 2 Drawing Sheets

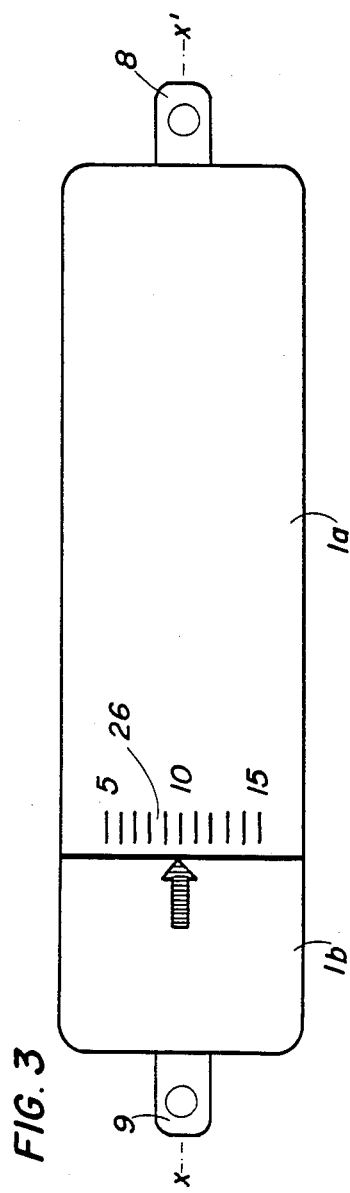

FISHING DEVICE

BACKGROUND OF THE INVENTION

Field of the Invention

This invention relates, in general, to line stress relieving devices and, in particular, to a new and useful line tension control deevice for facilitating the landing of a fish when it is being reeled in.

This device for facilitating the catching of fish, without like breakage, is, for instance, used in angling. The line comprises two portions; a first portion of a relatively long and thick line which is wound on the reel of a fishing rod. The line used for a second continuation portion is, advantageously, short and fine so as to go unnoticed by the fish, and carries, at its free end, the hook.

When an angler feels a fish is biting on the hook, he must cause the hook to penetrate the jaw of the fish by a quick flick of the wrist holding the rod. This is known as striking the fish.

Since the tip of the hook is sharp, a moderate pull on the line is usually enough to cause the hook to penetrate the flesh of the fish. The likelihood of the line breaking while the angler is striking the fish is thus very small.

Once hooked, the fish starts to thrash about wildly and if it is of sufficient size it can exert considerable pulls on the line, particularly when it hits the line with its tail.

It is at this stage of fishing that a line often breaks.

This is of course a serious drawback for an angler who, after having succeeded in striking the fish, sees it escape alone with the hook that has wounded it to no good purpose.

SUMMARY OF THE INVENTION

The invention provides a fishing device which, by being inserted between a first or thicker line portion and a second or thinner line portion, will absorb the sharp pulls that are exerted on the line due to the thrashing action of the fish, such pulls being liable to break the line.

According to the invention, there is provided a fishing device comprising a first body having first means for securing one end of a first portion of a line having two portions; a second body having second means for securing one end of the second of said tow line portions, the other end of one line portion carrying a hook; guide means enabling the two bodies to move relatively to one another; releasable holding means between the two bodies, exerting on the bodies a retaining force that maintains one body relative to the other body in a set initial position; and return means between the two bodies, exerting on the bodies, when they are free to move after having left said initial position under the action of a force, exerted on the line, an elastic return force tending to return the two bodies to their initial position.

Accordingly, it is an object of the invention to provide a fishing device for preserving a fishing line, comprising a cylinder having an end engageable with the fishing line, a piston movable in said cylinder and having a piston rod portion engageable with a continuation of the fishing line which is biased to a retracted position inside the cylinder and which includes a releasable engagement connection in the cylinder between the piston and the cylinder to hold it in a retracted position during an initial tensioning of the line when a fish strikes the like and being releasable after the pulling force is exerted on the line by the fish so that the biasing means dampens the tensioning during the landing of the fish.

A further object of the invention is to provide a device for controlling the tensioning of a fishing line so that it will not break during the ending of a fish and which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the Drawings:

FIG. 3 is a plan view of a second embodiment of the fishing device according to the invention, having means for adjusting the retaining force;

FIG. 4 is an axial section showing the internal structure of the fishing device shown in FIG. 3; and FIG. 4a is a cross-section along line A—A of FIG. 4 showing how the means for adjusting the retaining force are constructed.

GENERAL DESCRIPTION OF THE PREFERRED EMBODIMENTS

Figure 1:
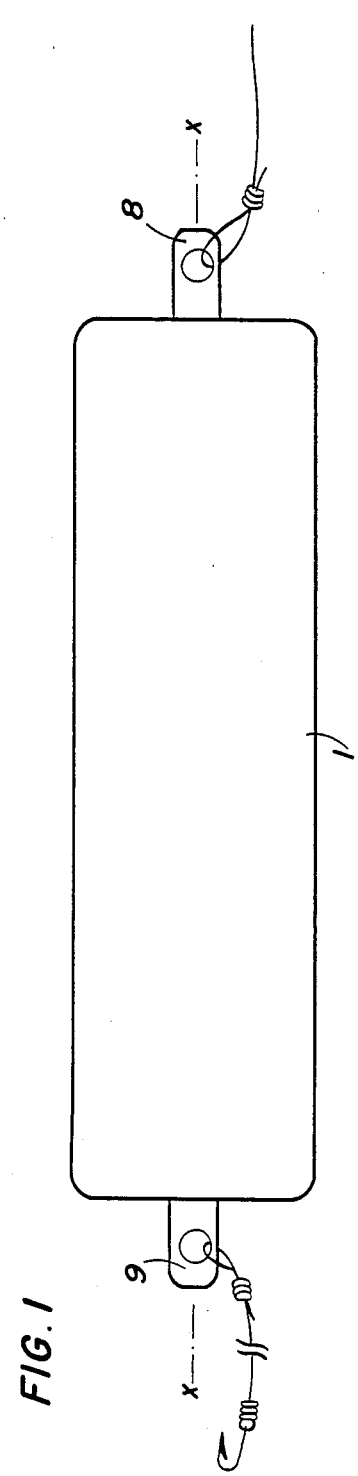
FIG. 1 is a plan view of a first embodiment of a fishing device constructed according to the invention.
Figure 2:
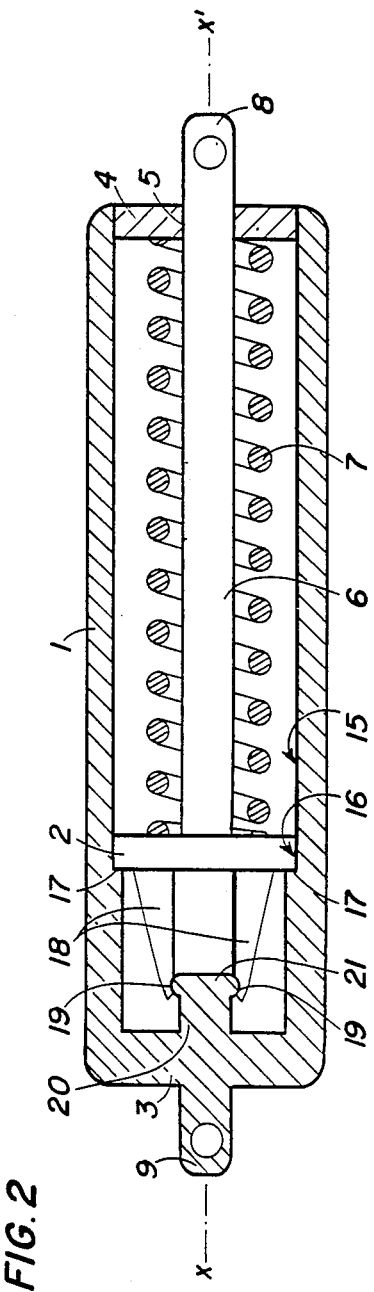
FIG. 2 is an axial section showing the internal structure of the fishing device shown in FIG. 1.

Referring to the drawings, in particular, the invention embodied therein in FIGS. 1 and 2 comprises a fishing device generally designated 1 which is connected in a fishing line by eyelet connections 8 to one part of the line and 9 to a continuation of the line.

The fishing device shown in FIGS. 1 and 2 comprises a hollow cylinder 1 and a disc-shaped piston 2 inside cylinder 1, these two components having a common axis of symmetry xx'. The ends of cylinder 1 are closed off at one end by an integral end wall 3 and at the opposite end by a fitted end wall 4 formed at its center with an axial hole 5. Typically, cylinder 1 is 15 mm long and 4 mm in diameter.

Piston 2 carries at the center of one of its flat surfaces a round rod 6 extending along axis xx'. On rod 6 is also fitted a coil spring 7. End wall 4 is then secured to cylinder 1 as by force-fitting, with rod 6 projecting through wall 4 out of hole 5 and spring 7 bearing on piston 2 and wall 4.

The free end of rod 6 is formed with an eyelet 8 and a similar eyelet 9 is formed in a tab provided on the outside of wall 3. One eyelet, 8 or 9, has attached thereto the free end of the line portion extending from the fishing rod, and the other eyelet has attached thereto the free end of the line portion carrying the hook.

The inside of cylinder 1 is defined by a cylindrical surface 15 and the periphery of piston 2 is defined by a cylindrical circumferential surface 16.

Over the major part of the length of cylinder 1, between wall 4 and a shoulder 17, surface 15 has the same diameter as piston 2, whereas between shoulder 17 and wall 3 surface 15 has a lesser diameter.

Surfaces 15 and 16 are therefore in contact and guide the motion of piston 2 within cylinder 1 between shoulders 17 and wall 4. The guiding action is further improved by rod 6 which is supported by wall 4 as it travels through hole 5. When piston 2 engages shoulder 17, it occupies a well-defined initial position in which spring 7 is unstressed.

Piston 2 is further provided, on its flat surface opposite wall 3, with a pair of jaws 18 arranged symmetrically in relation to axis xx'. Jaws 18 have some elasticity to and form axis xx' and their free ends are each formed with a groove 19.

Wall 3 is provided on its inner surface with a retaining stud 20, formed with a terminal flanged portion 21 having a shape complementary to that of grooves 19. When piston 2 is in its initial position, flange portion 21 is engaged in grooves 19. Jaws 18 then exert pressure on flange portion 21. This pressure produces an axially directed retaining force acting to maintain piston 2 in engagement with shoulder 17.

Jaws 18, flange portion 21 and associated members, together form self-releasing holding means. These holding means act to hold piston 2 in its initial position as long as it is not subjected to a pulling force, from the line, greater than the retaining force. As soon as the pulling force exceeds the retaining force, the holding means abruptly release the piston.

The illustrated fishing device operates as follows:

Piston 2 is first set in its initial position by pressing on the free end of rod 6, and the hook may then be cast. When a fish starts biting on the hook, the angler must strike it by quick flick of the wrist. Since the hook is very sharp, no great force need be applied to the line, but a very speedy reaction is needed otherwise the fish is likely to get away. The retaining force exerted on piston 2 is set to be larger than the pulling force needed to strike a fish and less than the force needed to break the finer portion of the line.

Thus, when the angler is striking the fish everything happens as if the line were uninterrupted since piston 2 does not move inside cylinder 1.

But, upon being hooked, the fish can exert tensions such, while thrashing about, as to cause the line to break. However, before the line actually does break, piston 2 releases itself from the position in which it is held by jaws 18 clamping flange portion 21. Piston 2 is thus free to move by acting on spring 7 which, when compressed, must not produce a force greater than the force needed to break the finer line portion.

While the angler reels in the fish, there is thus no longer any risk of the line breaking since the abrupt tensional variations will now be absorbed by spring 7.

The retaining force that is created by the action of jaws 18 on flange 21 must be within certain limits. These limits will in particular depend on the size of the fish and on the cross-section of the line portion carrying the hook. It may therefore be desirable to be able to vary the retaining force in dependence on these parameters.

The fishing device shown in FIGS. 3, 4 and 4a enables the retaining force to be readily adjusted. To this end, the hollow cylinder comprises a first part 1a in which a piston 2 is slidably mounted, and a second, cap-shaped, part 1b able to rotate on part 1 about axis xx'.

Piston 2 and associated parts are housed in part 1a in the same way as in cylinder 1, whereas cap 1b comprises an end wall, identical to wall 3, carrying a tab formed with an eyelet 9, and a retaining stud 20.

Cap 1b is held on cylinder part 1a by a pair of catches 25. Catches 25 are integral with part 1a and exhibit some elasticity where they joint part 1a so that they may flex towards an axis xx'.

Catches 25 are each formed with an outer groove 26 whereas the inner surface of cab 1b is formed with a pair of raised tracks 27 that engage in grooves 26 to hold part 1b axially on part 1a.

Each track 27 is spiral-shaped as shown in FIG. 4a. Thus, if cap 1b is moved angularly in the direction of arrow F, tracks 27 will cause catches 25 to flex towards axis xx'.

By so designing jaws and catches 27 that they contact one another at points 28 located substantially half-way between piston 2 and flange portion 21, any rotation of cap 2b will cause a change in the retaining force with the value of the latter being shown on a graduated scale 29.

The cylinder and the piston, in both forms of embodiment above described, are preferably made of injection-moulded synthetic material.

Further, both forms of embodiment may be modified in ways that will be readily apparent to a person skilled in the art, within the scope of the attached claims.

While specific embodiments of the invention have been shown and described in detail to illustrate the application of the principles of the invention, it will be understood that the invention may be embodied otherwise without departing from such principles.

What is claimed is:

1. A fishing device which comprises:
   a first body having first means for securing one end of a first portion of a line having two portions;
   a second body having second means for securing one end of the second of said two line portions, the other end of one line portion carrying a hook;
   guide means enabling the two bodies to move relative to one another;
   releasable holding means between the two bodies, exerting on said bodies a retaining force that maintains one body relative to the other body in a set initial position; and
   return means between the two bodies exerting on said bodies an elastic return force tending to return the two bodies to their initial position, when they are free to move after having left said initial position under the action of a force exerted on the line greater than the retaining force.

2. A fishing device according to claim 1, which further comprises means for adjusting the retaining force.

3. A fishing device according to claim 1, wherein said first body is a hollow cylinder having an axis of symmetry, said cylinder being internally delimited by an inner surface of circular cross-section and by two end walls, said second body is a piston slidably mounted within the cylinder, said piston being delimited by two end surfaces and a circumferential surface and bearing, on one of its end surfaces, a rod extending along said axis of symmetry and out of said cylinder through an opening formed in one of said end walls.

4. A fishing device according to claim 3, wherein said guide means are formed by the inner surface of the cylinder and the circumferential surface of the piston, said two surfaces being in sliding contact with one another.

5. A fishing device according to claim 1, wherein said holding means include, on said first body, a retaining stud having a terminal flanged portion and, on said second body, at least one pair of elastic jaws, each jaw defining at its free end a groove engageable with said flanged portion whereby the groove, upon engaging said flanged portion and exerting a pressure thereon, determine said initial position and said retaining force.

6. A fishing device according to claim 3, wherein a stud is provided on the end wall of the cylinder opposite to the end wall through which extends said rod, and jaws are provided on the surface of the piston facing said stud.

7. A fishing device according to claim 1, wherein said return means include spring means arranged between said two bodies, said spring means providing said return force and said return force having an intensity that increases as said bodies move away from the initial position.

8. A fishing device according to claim 3, wherein a helical compression spring is arranged over said rod and bearing on the piston and on the end wall of the cylinder through which extends said rod.

9. A fishing device according to claim 5, wherein a retaining force adjusting means includes at least one pair of internal, spirally shaped tracks arranged in a plane perpendicular to the axis of symmetry on a rotatable portion of said first body, each track bearing, with a force that varies depending on the angular position of said rotatable portion, via a radially movable element on an adjacent portion of said first body, on one of said jaws to adjust the pressure the jaws exert on said flanged portion.

10. A fishing device according to claim 1, wherein said first and second bodies are made of synthetic material.

11. A fishing device for preserving a fishing line, comprising a cylinder having an end engageable with the fishing line, a piston movable in said cylinder and having a piston rod portion in engagement with a continuation of the fishing line, spring means biasing said piston to a retracted position of said piston rod portion, releasable engagement ring means in said cylinder engaging said piston and holding it in a retracted position, said piston remaining in a retracted position upon initial tensioning of the fishing line, but being released subsequently under the pulling force of a fish so that said spring means acts to dampen the tensioning during the landing of the fish.

* * * * *